US009047101B2

(12) United States Patent
Cabillic et al.

(10) Patent No.: US 9,047,101 B2
(45) Date of Patent: Jun. 2, 2015

(54) METHOD FOR COMPILING AN INTERMEDIATE CODE OF AN APPLICATION

(75) Inventors: Gilbert Cabillic, Brece (FR); Jean-Philippe Lesot, Argentre du Plessis (FR)

(73) Assignee: Google Inc., Mountain View, CA (US)

( * ) Notice: Subject to any disclaimer, the term of this patent is extended or adjusted under 35 U.S.C. 154(b) by 65 days.

(21) Appl. No.: 13/992,130

(22) PCT Filed: Dec. 6, 2011

(86) PCT No.: PCT/EP2011/071982
§ 371 (c)(1),
(2), (4) Date: Nov. 21, 2013

(87) PCT Pub. No.: WO2012/076557
PCT Pub. Date: Jun. 14, 2012

(65) Prior Publication Data
US 2014/0109068 A1    Apr. 17, 2014

(30) Foreign Application Priority Data
Dec. 6, 2010   (FR) .................................... 10 60149

(51) Int. Cl.
*G06F 9/45*    (2006.01)
(52) U.S. Cl.
CPC    *G06F 8/443* (2013.01); *G06F 8/41* (2013.01); *G06F 8/52* (2013.01)
(58) Field of Classification Search
None
See application file for complete search history.

(56) References Cited

U.S. PATENT DOCUMENTS

| | | | | |
|---|---|---|---|---|
| 5,920,720 | A * | 7/1999 | Toutonghi et al. | 717/148 |
| 6,854,113 | B1 * | 2/2005 | Sankar et al. | 718/1 |
| 8,522,239 | B1 * | 8/2013 | Dobrovolskiy et al. | 718/1 |
| 2002/0095664 | A1 | 7/2002 | Chou | |
| 2005/0086650 | A1 * | 4/2005 | Yates et al. | 717/139 |
| 2008/0127125 | A1 * | 5/2008 | Anckaert et al. | 717/136 |
| 2010/0042983 | A1 * | 2/2010 | Vick et al. | 717/153 |
| 2010/0050162 | A1 * | 2/2010 | Alkins et al. | 717/128 |
| 2011/0016458 | A1 * | 1/2011 | Beale et al. | 717/139 |
| 2011/0035733 | A1 * | 2/2011 | Horning et al. | 717/140 |
| 2013/0283249 | A1 * | 10/2013 | Kanhere et al. | 717/139 |

OTHER PUBLICATIONS

Prokopski, Gregory et al., "Analyzing the Performance of Code-Copying Virtual Machines", Proceedings of the 23rd ACM Sigplan Conference on Object Orientated Programming Systems Languages and Applications, OOPSLA '08, Jan. 1, 2008, pp. 403-421.

(Continued)

*Primary Examiner* — Chameli Das
(74) *Attorney, Agent, or Firm* — McDonnell Boehnen Hulbert & Berghoff LLP

(57) ABSTRACT

A method for compiling an original application written in an intermediate code, in which the original application is executed by means of a virtual machine. The method supplies a native application having a native binary code. The method includes: extracting at least one intermediate code instruction at least one corresponding function input point; a first step of compiling the intermediate code of the application to a code that includes control flow management and calls said at least one input point of each function implementing the instructions of the intermediate code; and a second step of compiling the compiled application code and intermediate code functions supplying the optimised native application.

20 Claims, 2 Drawing Sheets

(56) References Cited

OTHER PUBLICATIONS

Figure 1:
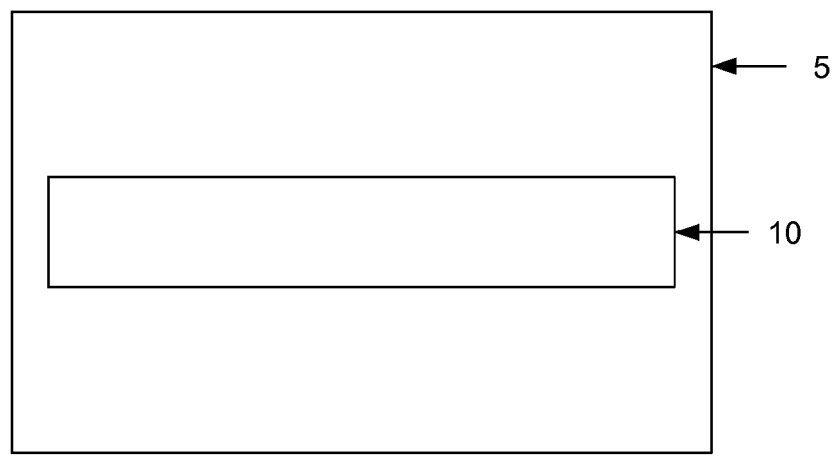

Gregg, David et al., "Optimizing Code-Copying JIT Compliers for Virtual Stack Machines", Concurrency and Computation: Practice and Experience, vol. 18, No. 11, Sep. 1, 2006, pp. 1465-1484.

Vitale et al., "Catenation and Specialization for Tcl Virtual Machine Performance", Proceedings of the 2004 Workshop on Interpreters, Virtual Machines and Emulators, IVME '04, Jan. 1, 2004, pp. 42-50.

Ertl et al., "Retargeting JIT Compilers by Using C-Compiler Generated Executable Code", Parallel Architecture and Compilation Techniques, 2004, PACT 2004 Proceedings, 13th International Conference on Antibes Juan-Les-Pins, France Sep. 29-Oct. 3, 2004, pp. 41-50.

Debbabi et al., "A Selective Dynamic Compiler for Embedded Java Virtual Machines Targeting ARM Processors", Science of Computer Programming, Elsevier BV, NL, vol. 59, No. 1-2, Jan. 1, 2006, pp. 38-63.

Titzer et al., "The ExoVM System for Automatic VM and Application Reduction", Proceedings of the 2007 ACM Sigplan Conference on Programming Language Design and Implementation, PLDS '07. Jan. 1, 2007, pp. 352-362.

International Search Report prepared by the European Patent Office in International Application No. PCT/EP2011/071982, completed Feb. 24, 2012.

* cited by examiner

METHOD FOR COMPILING AN INTERMEDIATE CODE OF AN APPLICATION

CROSS-REFERENCE TO RELATED APPLICATIONS

This Application is a Section 371 National Stage Application of International Application No. PCT/EP2011/071982, filed Dec. 6, 2011, which is incorporated by reference in its entirety and published as WO 2012/076557 on Jun. 14, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The invention pertains to the compilation of applications. The present invention pertains more particularly to the compilation and optimizing of applications that are to be implemented on several different software and/or hardware platforms.

PRIOR-ART SOLUTIONS

There are several types of application runtime environments. The application runtime environments make it possible to produce binary code that is directly executable by the processor of the terminal. In this case, the terminal first of all has application programming interfaces (APIs) used to develop the application. As examples, we can cite the Windows or Linux systems which can be executed on different processors with different peripherals. The designer of an application develops it over compatible libraries, the application being then compiled in binary code through the development environment. Since the binary code is dependent on each processor, it is necessary to develop one binary code per type of processor. The advantage of this approach is that the processor directly executes the code of the application. In the context of native object systems such as C++ for example, it can be noted that the object runtime environment is linked as a library to the application.

Other environments make it possible to execute an application in the form of an intermediate code through a runtime environment comprising a set of libraries.

For example, the Android™ environment gives preference to the development of applications in JAVA™ object language and offers a set of programming interfaces (APIs). The development environment will compile the JAVA™ code of the application in dex (Dalvik Executable) intermediate code that is executable through the Dalvik virtual machine integrated into the Android runtime environment.

In this type of environment, the virtual machine relies on an operating system and a layer of integration of the two systems is obtained in order to set up a gateway between the two worlds, namely the native and virtual worlds. This integration is very strongly coupled both to the virtual machine and to the operating system.

In order to execute the intermediate code, this virtual machine can either comprise an interpreter which emulates all the intermediate code instructions on the machine or enable the AOT (ahead-of-time) compiling of the intermediate code into binary code before executing it. It can be noted that, in the AOT context, the compilation is limited to the code of the application, which is based on interfaces to interact with the virtual machines and the runtime environment of the terminal.

Other compilation techniques make it possible to obtain the dynamic compilation of an intermediate code into binary code, for example JIT (just-in-time) compilation or DAC (dynamic adaptive compilation). Just as in the case of the AOT, the compilation is limited to the code of the application, this code being based on interfaces to interact with the virtual machine and the runtime environment of the terminal.

Indeed, the binary code generated must comply with certain constraints so that the virtual machine and the runtime environment maintain control over the execution of the different applications. Thus, this binary code uses a specific communications interface for the communication between the two (virtual/native) worlds. It cannot carry out the memory management of the objects. It should not carry out an intrusion into object management whatever it is (invocation, field access). All this is intended to meet constraints by which it is possible not to question the working of the virtual machine and its overall management of the system.

Thus, because of these constraints, the possibility of obtaining a maximum native code for an application remains limited. It may be recalled that the primary utility of having a maximum active code is that it gives the benefit of performance far better than that of the intermediate code through the execution of this code on the processor without interpretation as well as by limiting the exchanges between the two worlds which penalize execution.

Thus, with respect to an approach with a runtime based on a virtual machine, this code makes it possible to totally or partially abstract the specific parts of the terminal and simplifies the possibility of execution an application on a different set of terminals. However, the weak point of this approach is that it does not allow for the possibility of having a code optimized totally for each application.

SUMMARY OF THE INVENTION

An aspect of the present disclosure relates to a method, which comprises:
  a step for extracting each intermediate code instruction at a function input point;
  a step for compiling the intermediate code of the application into a code integrating the management of the control stream and calling the input points of each function performing the instructions of the intermediate code;
  a step for compiling compiled applications code and intermediate code functions enabling the production of one single optimized binary code.

In other words, the invention proposes a method for compiling an intermediate code or combined code or source code of an application into native binary code in its totality or partially. According to the invention, this method guarantees that the virtual machine will retain control of the execution of the applications without disturbing it.

According to a preferred implementation, the different steps of the method according to the invention are implemented by a software program or computer program, this software program comprising software instructions that are to be executed by a data processor of a relay module according to the invention and being designed to command the execution of the different steps of this method.

Consequently, the invention also pertains to a program capable of being executed by a computer or by a data processor, this program comprising instructions to command the execution of the steps of a method as mentioned here above.

This program can use any programming language whatsoever, and be in the form of source code, object code or intermediate code between source code and object code such as in a partially compiled form or in any other desirable form.

The invention also seeks to obtain an information carrier readable by a data processor and comprising instructions of a program as mentioned here above.

The information carrier can be any entity or device capable of storing a program. For example, the carrier may comprise a storage means such as a ROM, for example a CD ROM or a microelectronic circuit ROM or again a magnetic recording means, for example a floppy disk or a hard disk drive.

Besides, the information carrier can be a transmissible carrier such as an electrical or optical signal that can be conveyed through an electrical or optical cable, by radio or by other means. The program according to the invention can especially be downloaded on an Internet type network.

As an alternative, the information carrier can be an integrated circuit in which the program is incorporated, the circuit being adapted to execute the method in question or to be used in the execution of the method in question.

According to one embodiment, the invention is implemented by means of software and/or hardware components. From this point of view, the term "module" may correspond in this document equally well to a software component and to a hardware component or to a set of hardware and software components.

A software component corresponds to one or more computer programs, one or more sub-programs of a program or more generally to any element of a program or a software program capable of implementing a function or a set of functions according to what is described here below for the module concerned. A software component of this kind is executed by a data processor of a physical entity (a terminal, a server, etc) and is capable of accessing the hardware resources of this physical entity (memories, recording media, communications buses, electronic input/output boards, user interfaces, etc).

In the same way, a hardware component corresponds to any element of a hardware unit capable of implementing a function or a set of functions according to what is described here below for the module concerned. It may be a programmable hardware component or a component with integrated processor for the execution of software, for example an integrated circuit, a smartcard, a memory card, an electronic board for executing firmware, etc.

LIST OF FIGURES

Figure 4:
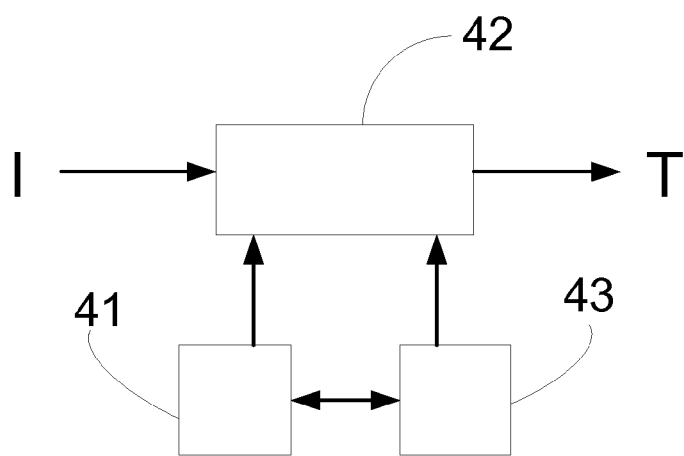
Figure 2:
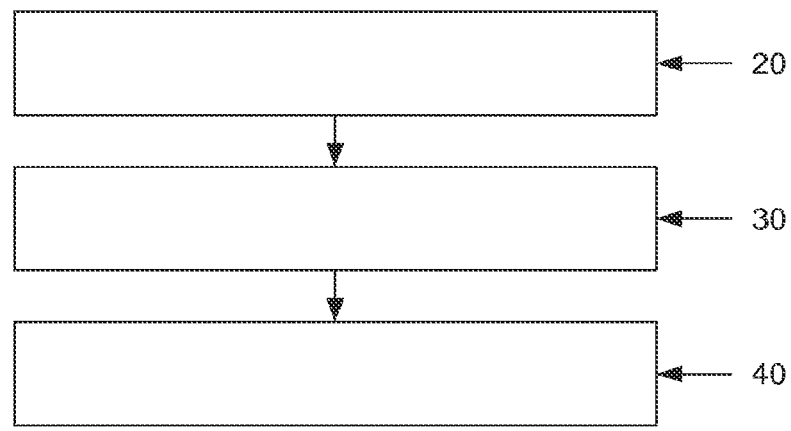
Figure 3:
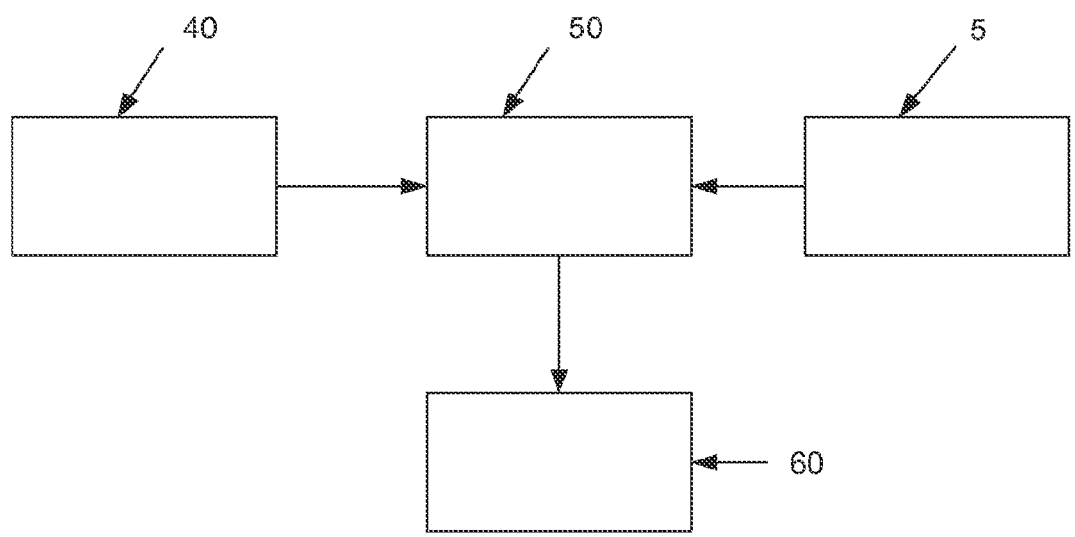

Other features and advantages of the invention shall appear more clearly from the following description of a preferred embodiment, given by way of a simple, illustrative and non-exhaustive example and from the appended drawings, of which:

FIG. 1 describes the extraction of the intermediate code functions;

FIG. 2 describes the compilation of the application in the form of a calling on the intermediate code functions;

FIG. 3 describes the compilation in binary mode of the application integrating the intermediate code functions;

FIG. 4 describes a device for making available according to the invention.

DETAILED DESCRIPTION OF THE INVENTION

1. Reminder of the Principle of the Invention

The invention can be applied to an execution (runtime) environment executing a virtual machine integrating an interpreter, whether this machine has AOT, JIT or a DAC compilation The goal of this method is to enable the compilation of an application in intermediate code totally in native mode while at the same time integrating the code of the execution runtime and that of the functions of the virtual machine that enables the performance of the intermediate code and the management of the behavior of the application over the operating system. In other words, the runtime of the virtual machine is integrated into an application. At the same time, the software elements of the virtual machine that are necessary for the application are integrated into this new application.

The first step of the method (10, FIG. 1) consists in building or extracting one function for each intermediate code operation according to the specification of this intermediate code.

For example, if there is an "operation_X" intermediate code which necessitates two arguments to get executed, then an operation_X(param1, param2) intermediate_code function is created or extracted.

Thus, the entire intermediate code (05, FIG. 1) is available in the form of a set of functions. This sub-division can be done manually or automatically, prior to the compilation of the code of the application.

In a second step, a compiler (30, FIG. 2) compiles an intermediate code (20, FIG. 2) of an application into a code calling each of these functions (40, FIG. 2). This compiler also makes it possible to integrate the management of the execution stream (for example the direct branchings) in order to make the generated code completely independent of the interpreter of the virtual machine.

For example, if an intermediate code "0x43 0x22 0x21" corresponds to the operation_X with "0x22" and "0x21" as a parameter, it is converted into a call to the operation_X(0x22, 0x21) function. This operation is called translation.

In a third step, a compiler (50, FIG. 3) compiles the code of the application coming from the translation (40, FIG. 3) by means of the runtime functions (5, FIG. 3) in order to produce an optimized binary code (60, FIG. 3).

Consequently, the code of the runtime and of the virtual machine is compiled simultaneously through the compilation of the code of the compiled application. This method thus enables the generation, from the intermediate code of the application, of the binary code because of which there is no longer any need for the interpreter of the virtual machine or the AOT, JIT or DAC compilation which could be associated with it.

Furthermore, since each intermediate code is identical to the original code, and since the compiler makes it possible to control the execution similarly to the way in which the interpreter of the virtual machine would have done, the semantics and behavior of the binary program will be identical to that interpreted by the virtual machine. Thus, the intermediate code is compiled in native form without bringing the overall management of the virtual machine into question. The application becomes a process of the operating system using the native libraries of the execution runtime and of the virtual machine (without the interpreter) and in using the instructions of the processor. The application becomes a process independent of the interpreter and of the process of the virtual machine.

In enabling the elimination of the use of the interpreter of the virtual machine, this compilation method also lightens the data memory load of the platform and improves the performance of the terminal.

Once the entire code is executed in native mode, the compiler also has the opportunity to make optimizations that are more aggressive than those it could have done previously because of the access interface of the virtual machine. The method of compilation thus makes it possible to obtain the maximum optimization possible for a static compilation of the code of an application.

Since the communications between the native code and the virtual machine are totally eliminated and since the native code is executed without need of the interpreter of the virtual machine directly by the processor, the overall performance of the terminal is increased and the energy consumption of the terminal is reduced.

Applied to all the intermediate codes of a terminal, this method furthermore makes it possible to completely remove the need for the interpreter of the virtual machine as well as the JIT/DAC or AOT coupled with it. The totality of the code becomes native, and all that remains is the operating system and the native parts of the execution runtime.

In one particular implementation, the translation and compilation could be done offline, directly by the development environment of the terminal.

In another implementation, the translation could be done offline, directly by the development environment of the terminal, and the compilation in binary code could be done on the terminal if a compiler is available on the terminal.

In another implementation, the translation and the compilation in binary mode are done on the terminal if a compiler is available on the terminal.

It must be noted that this method makes it possible to continue making runtime upgrades by modifying the code of each function performing the intermediate code. It is thus possible to achieve developments in the functions and specifications of the execution runtime.

FIG. 4 is a simplified view of an example of a structure of a device for making available according to one embodiment of the invention.

For example, the device for making available comprises a memory 41 constituted by a buffer memory, a processing unit 42, equipped for example with a microprocessor and a random-access memory, and driven by the computer program 42, implementing a program for making available according to the invention.

At initialization, the computer program code instructions 43 are for example loaded into a memory and then executed by the processor of the processing unit 42. The microprocessor, the random-access memory, the computer program work together and form the means for making available according to the method of the invention in this embodiment. In other embodiments, specific hardware processing modules can be implemented to apply the invention.

2. Description of One Particular Embodiment.

Here below, we describe a particular implementation built by means of the LLVM (low-level virtual machine) compiler. LLVM is a compiler infrastructure designed to optimize the compilation, linking, execution and idle time in a program written in any unspecified language. The LLVM compilation tools comprise a set of compilation tools based on an intermediate code called bytecode. LLVM comprises especially a linker capable of linking several bytecode files into a single bytecode. LLVM also comprises an optimizer capable of optimizing a bytecode into an optimized bytecode independent of the processor. This optimizer has numerous optimizations. LLVM also has several binary code generators. These generators can be executed either on the terminal or on a server or on a developed machine. LLVM has the advantage of having available a large number of generators for different types of processors as well as a substantial number of optimizations used independently of the target processor.

LLVM is a compiler having available an intermediate representation (IR). Like most compilers, LLVM has the notion of a basic block which is a sequence of instructions containing no branch instructions. A basic block can only end in a branch, conditional or unconditional, to another basic block or else by "unreachable" instruction or else again by a "return" instruction. LLVM also has a notion of functions similar to the notion of function of an imperative language, with input parameters and one output parameter. LLVM also possesses the notion of "alloca" used to store a local variable with a function.

Let A be an application, the executable code of which is constituted by a multitude of functions or methods $M_i$, themselves constituted by instructions of an intermediate language LI. Let MV be a virtual machine that can interpret each instruction of the intermediate language LI. MV is formed by an interpreter which, for each instruction $I_j$ of LI, executes a code fragment $C_j$. $C_j$ is written either in a particular top-level language such as the language C, or a low-level language such as an assembler.

On the basis of these assumptions, the invention is applied as follows according to one embodiment. Naturally, other embodiments can be envisaged depending on the constraints of the intermediate language.

To obtain the application A in a binary format compatible with the behavior of MV, the executable code of A is first of all compiled as a series of LLVM instructions by means of a compiler C. To this end, in one embodiment, for each method $M_i$ of A, C creates a function $F_i$. For each instruction $I_j$ of $M_i$, C creates a basic block $B_j$, and maintains a table of correspondence between $I_j$ and $B_j$, herein after called $T_i$. In one embodiment, for each variable $V_k$ of $M_i$, C creates a LLVM "allocation" $A_k$.

Then, in one embodiment, for each instruction $I_j$ of $M_i$:

for an instruction $I_j$ that does not modify the control stream of A, C generates a call instruction $B_j$ to a function that contains the code $C_j$ coming from MV. If $I_j$ takes a variable $V_k$ as an operand, then the alloca $A_k$ is passed as a parameter to $C_j$. If $I_j$ takes a literal value L as an operand, then L is passed as a parameter to $C_j$. Finally, C generates an instruction that branches unconditionally to the following basic block $B_{j+1}$.

for an instruction $I_j$ modifying exclusively the control stream of A (i.e. the unconditional instructions, conditional branching, etc) C generates in $B_j$ a branch equivalent to $I_j$ in IR in using the correspondence table $T_i$.

for an instruction $I_j$ modifying the control stream by means of exceptions, C generates a call instruction in $B_j$ to a function that contains the code $C_j$ coming from MV. If $I_j$ takes a variable $V_k$ as an operand, then the alloca $A_k$ is passed as a parameter to $C_j$. If $I_j$ takes a literal value L as an operand, then L is passed as a parameter to $C_j$. Then C subsequently generates a code which verifies that no exception has been launched by $C_j$. If this is the case, C generates a branching instruction in $B_j$ for branching to a basic block $BE_j$. If this is not the case, C generates an instruction branching unconditionally to the following basic block $B_{j+1}$.

At the end of this process, in each basic block BEj, C generates an instruction which writes an "alloca" PC with the value j, and then an instruction which branches to a basic block of a dispatcher BDi.

At the end of this process, in each basic block BDi, C generates a call to a function present in MV to dispatch the exceptions as a function of the localization of the exception contained in PC. In return, this function sends back a new branching localization t. Then, C generates an instruction of IR capable, from the value t, of branching to the basic block Bt.

Once this process is ended, the intermediate code generated contains as many functions Fi as the original method Mi of the original application A.

A runtime library RT, containing all the codes Cj of MV, as well as all the codes referenced recursively by the codes Cj, is then generated by using a compiler comprising the language of the codes Cj and generating LLVM intermediate code. For example, if the codes Cj are written in C language, the LLVM program "Clang" enables the conversion of these codes into LLVM intermediate code (bytecode).

Finally, the LLVM compilation chain, by means of the linker, enables the optimizer and the code generator to take all the functions Fi of A, all the functions Fi of the libraries recursively used by A, as well as the library RT, link them, optimize them and translate them into binary code.

Because the LLVM compilation chain makes it possible to carry out optimizations during the linking phase of the program, the binary code obtained will be greatly optimized, and the calls to the functions that contain Cj could, for example, have disappeared to leave the code Cj directly in the body of the functions F.

At the end of this process, we obtain a highly optimized native binary code of the application A. The execution of this code is similar to the execution of the application A by the virtual machine MV, since the codes brought into play by this function come from MV, except for the control stream codes which are transferred from an interpreter, in the version of the application A using the virtual machine MV, to the use of the control stream instructions for the target processor in the binary version of the application A.

Naturally, in other embodiments, it is also possible to select only certain methods, certain instructions and certain variables. The embodiments presented here above implement the operations described generally but it is possible to implement them in a targeted way, as a function of the optimizations that are to be made and the degree of independence that is to be obtained from the virtual machine and its interpreter. The phases of intermediate code extraction and compilation are then adapted to requirements.

An exemplary embodiment of the invention makes it possible to remove one or more the constraints of the prior art by defining a method of compilation enabling the compiling of an intermediate code in its totality by integrating the code of the virtual machine and of the runtime into the compilation while at the same time maintaining the semantics of the execution runtime.

Although the present disclosure has been described with reference to one or more examples, workers skilled in the art will recognize that changes may be made in form and detail without departing from the scope of the disclosure and/or the appended claims.

The invention claimed is:

1. A method for compiling an intermediate code of an original application while a virtual machine executes the original application, the method comprising:

determining, by a processor, runtime functions in the intermediate code of the original application;

generating, by the processor, code based on the intermediate code of the original application, wherein the generated code includes calls to the runtime functions enabling performance of instructions in the intermediate code;

responsive to generating the code, integrating a control system associated with the virtual machine into the generated code, wherein the control system enables execution of the generated code at the virtual machine independent of an interpreter; and compiling, by the processor, the generated code and the runtime functions in the intermediate code to provide an optimized native application comprising a native binary code.

2. The method of claim 1, wherein determining, by the processor, the functions in the intermediate code of the original application comprises:

extracting one or more runtime functions in the intermediate code.

3. The method of claim 1, wherein integrating the control system associated with the virtual machine into the generated code comprises:

integrating a runtime of the virtual machine into the generated code.

4. The method of claim 3, wherein integrating the runtime of the virtual machine into the generated code further includes integrating software elements of the virtual machine into the generated code at the same time.

5. The method of claim 1, wherein determining, by the processor, the runtime functions in the intermediate code of the original application comprises:

creating one or more runtime functions based on the instructions in the intermediate code of the original application.

6. The method of claim 1, wherein the control system associated with the virtual machine also enables the processor to compile the generated code without an interpreter.

7. The method of claim 1, wherein generating, by the processor, code based on the intermediate code of the original application comprises:

translating instructions in the intermediate code into one or more calls for the generated code.

8. The method of claim 7, wherein translating instructions in the intermediation code into the one or more calls for the generated code is executed offline in a development environment of a terminal associated with the virtual machine.

9. The method of claim 1, wherein compiling the generated code and the runtime functions in the intermediate code to provide an optimized native application comprises:

compiling the generated code at the same time as compiling the runtime functions in the intermediate code.

10. The method of claim 1, wherein the optimized native application comprising the native binary code is configured to execute independent of an interpreter at the virtual machine.

11. The method of claim 1, further comprising:

modifying the native binary code of the native application corresponding to one or more runtime functions in the intermediate code to update the native application.

12. The method of claim 1, further wherein the control system includes a control stream associated with the virtual machine.

13. A device for compiling an intermediate code of an original application while a virtual machine executes the original application, wherein the device comprises:

one or more processors;

a memory having stored thereon instructions that, upon execution by the one or more processors, cause the device to perform functions comprising:
  determining runtime functions in the intermediate code of the original application;
  generating code based on the intermediate code of the original application, wherein the generated code includes calls to the runtime functions enabling performance of instructions in the intermediate code;
  responsive to generating the code, integrating a control system associated with the virtual machine into the generated code, wherein the control system enables execution of the generated code at the virtual machine independent of an interpreter; and
  compiling the generated code and the runtime functions in the intermediate code to provide an optimized native application comprising a native binary code.

14. The device of claim 13, wherein the control system includes software elements associated with the virtual machine that enables execution of the generated code.

15. The device of claim 13, wherein determining, by the processor, the runtime functions in the intermediate code of the original application comprises:
  extracting the runtime functions in a manual or automatic process prior to compiling the intermediate code of the original application.

16. The device of claim 13, further comprising:
  modifying the native binary code of the native application corresponding to one or more runtime functions in the intermediate code to update the native application.

17. The device of claim 13, wherein generating, by the processor, code based on the intermediate code of the original application further includes:
  translating instructions in the intermediate code into one or more calls to the runtime functions.

18. A computer-readable storage device comprising a computer program product stored thereon and executable by a data processor, wherein the product comprises program code instructions for executing a method for compiling an intermediate code of an original application when the instructions are executed by the data processor, wherein the method comprises:
  determining, by a processor, runtime functions in the intermediate code of the original application;
  generating, by the processor, code based on the intermediate code of the original application, wherein the generated code includes calls to the runtime functions enabling performance of instructions in the intermediate code;
  responsive to generating the code, integrating a control system associated with the virtual machine into the generated code, wherein the control system enables execution of the generated code at the virtual machine independent of an interpreter; and
  compiling, by the processor, the generated code and the runtime functions in the intermediate code to provide an optimized native application comprising a native binary code.

19. The computer-readable storage device of claim 18, wherein the function of compiling the generated code and the runtime functions in the intermediate code to provide an optimized native application comprises:
  compiling the generated code at the same time as compiling the runtime functions in the intermediate code.

20. The computer-readable storage device of claim 18, wherein the optimized native application comprising the native binary code includes binary code corresponding to a runtime and software elements associated with the virtual machine.

* * * * *